US011407325B2

(12) United States Patent
Langton et al.

(10) Patent No.: US 11,407,325 B2
(45) Date of Patent: Aug. 9, 2022

(54) SYSTEMS AND METHODS FOR INTEGRATING ON-PREMISES ELECTRIC APPLIANCES WITH VEHICLE-TO-GRID ELECTRIC VEHICLES

(71) Applicant: Bayerische Motoren Werke Aktiengesellschaft, Munich (DE)

(72) Inventors: Adam Langton, Mountain View, CA (US); Isaac Lund, Salinas, CA (US); Sean Batir, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 552 days.

(21) Appl. No.: 16/455,456

(22) Filed: Jun. 27, 2019

(65) Prior Publication Data

US 2020/0406778 A1 Dec. 31, 2020

(51) Int. Cl.
| | |
|---|---|
| *B60L 53/64* | (2019.01) |
| *B60L 53/50* | (2019.01) |
| *B60L 3/12* | (2006.01) |
| *G06Q 50/06* | (2012.01) |
| *G05F 1/66* | (2006.01) |

(52) U.S. Cl.
CPC ............. *B60L 53/64* (2019.02); *B60L 3/12* (2013.01); *B60L 53/50* (2019.02); *G05F 1/66* (2013.01); *G06Q 50/06* (2013.01)

(58) Field of Classification Search
CPC .. B60L 53/64; B60L 3/12; B60L 53/50; B60L 1/02; B60L 55/00; G05F 1/66; G06Q 50/06; Y02E 60/00; Y02T 10/70; Y02T 10/7072; Y02T 90/12; Y02T 90/16; Y02T 90/167; Y04S 10/126; Y04S 30/14
See application file for complete search history.

(56) References Cited

U.S. PATENT DOCUMENTS

| | | | |
|---|---|---|---|
| 2018/0037131 A1* | 2/2018 | Son | B60L 55/00 |
| 2020/0101850 A1* | 4/2020 | Harty | B60L 55/00 |
| 2020/0410580 A1* | 12/2020 | Takada | B60L 53/66 |

* cited by examiner

*Primary Examiner* — Nha T Nguyen
(74) *Attorney, Agent, or Firm* — Crowell & Moring LLP

(57) ABSTRACT

An energy management system includes a local power grid configured to route electricity, the local power grid configured to receive electricity from a municipal power grid of a utility service provider; an electric appliance electrically coupled to the local power grid, the electric appliance configured to receive electricity from the local power grid for operating according to an energy usage state; an electric vehicle electrically coupleable to the local power grid, the electric vehicle configured to exchange electricity with the local power grid; and a system server communicatively coupled to the electric appliance and the electric vehicle. The system server configured to: receive utility related data, appliance related data, and vehicle related data, determine, based on the received data, a vehicle-to-grid energy cost and a utility energy cost, and control the electric vehicle to discharge electric energy to the local power grid for operating the electric appliance, based on a comparison of the vehicle-to-grid energy cost with the utility energy cost for operating the electric appliance according to the energy usage state.

20 Claims, 4 Drawing Sheets

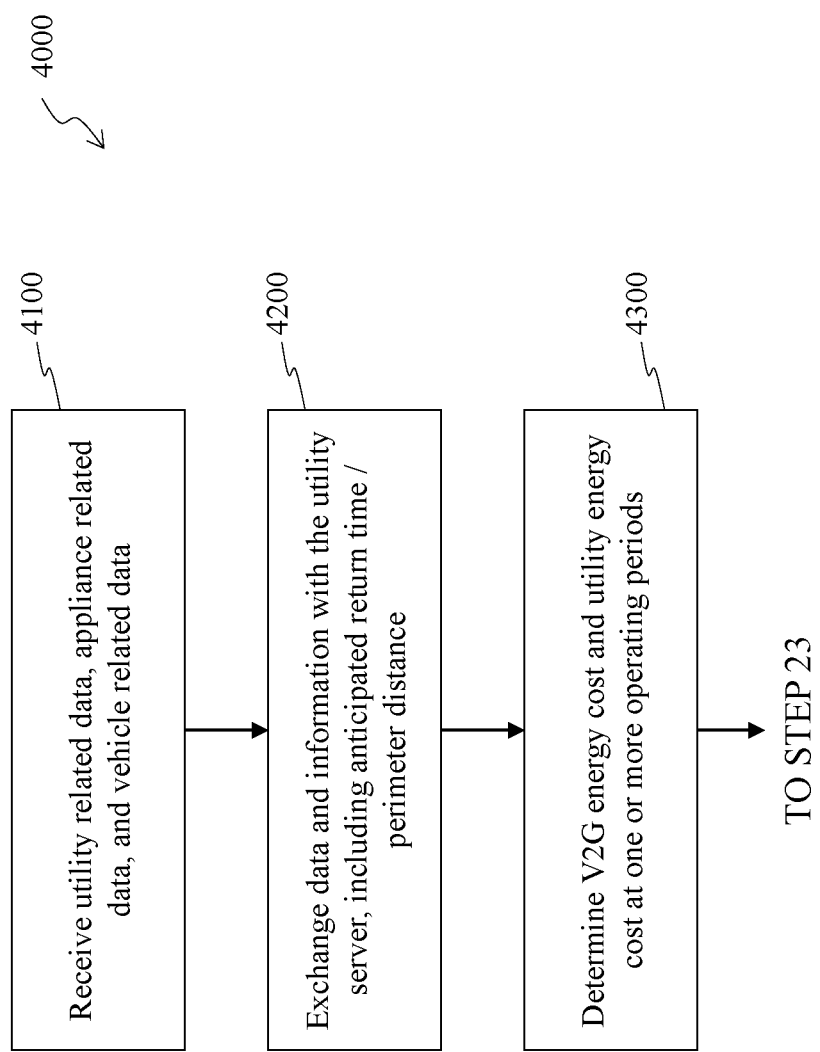

SYSTEMS AND METHODS FOR INTEGRATING ON-PREMISES ELECTRIC APPLIANCES WITH VEHICLE-TO-GRID ELECTRIC VEHICLES

FIELD OF THE INVENTION

The present invention relates generally to systems and methods for integrating on-premises electric appliances with vehicle-to-grid electric vehicles.

BACKGROUND OF THE INVENTION

The operation of on-premises electric appliances can account for a significant share of the premises' utility (e.g., electricity) costs. The operation of electric hot water heaters to produce hot water, for example, can account for around 10% of a household's electric bill, and upwards of 30% of the electric bill of hotels and other commercial buildings. Some appliances, such as hot water heaters, heating-ventilation-air-conditioning (HVAC) units, etc., use electricity to attain and maintain a usable state. For example, water heaters may heat water to a given temperature set by the user, and may maintain the heated water at the given temperature. Because it is generally not known when the hot water (or other medium) will be used, the appliance is typically set to a static level and left there, so that the appliance will achieve and then maintain the usable state for a prolonged period during which the heated water (or other medium) is not being used. This is wasteful and inefficient.

However, in some appliances, it is possible to maintain the usable state for a number of hours without using much energy. This characteristic of certain appliances allows them to, in effect, store energy, e.g., in the form of heat, for later use. This characteristic can also be leveraged to reduce peak rate loads for local electricity grids. Smart appliances, for example, may adjust their electricity consumption to reduce peak rate loads. Electric vehicles that use local power grids for charging are also known to adjust their electricity consumption to avoid peak rate loads.

Unlike most electric appliances, however, electric vehicles are also able to provide their stored electric energy to the local power grid (and even back to the municipal power grid) via so-called vehicle-to-grid (V2G) functionality. The efficient trading of electric energy amongst energy stores is called energy arbitrage.

Systems and methods are therefore needed that utilize the full load balancing capabilities of a V2G electric vehicle to facilitate improved energy arbitrage and management among the smart water heater, the electric vehicle, the local power grid, and the municipal power grid. Such systems and methods will enable improved utilization of cheaper and greener energy.

SUMMARY OF THE INVENTION

Disclosed and claimed herein are devices, systems and methods for integrating on-premises electric appliances with vehicle-to-grid electric vehicles so as to facility improved energy arbitrage and management.

An exemplary energy management system according to the invention includes a local power grid configured to route electricity, the local power grid configured to receive electricity from a municipal power grid of a utility service provider; an electric appliance electrically coupled to the local power grid, the electric appliance configured to receive electricity from the local power grid for operating according to an energy usage state; an electric vehicle electrically coupleable to the local power grid, the electric vehicle configured to exchange electricity with the local power grid; and a system server communicatively coupled to the electric appliance and the electric vehicle. The system server configured to: receive utility related data, appliance related data, and vehicle related data, determine, based on the received data, a vehicle-to-grid energy cost and a utility energy cost, and control the electric vehicle to discharge electric energy to the local power grid for operating the electric appliance, based on a comparison of the vehicle-to-grid energy cost with the utility energy cost for operating the electric appliance according to the energy usage state.

An exemplary method according to the invention includes: receiving utility related data (which could include utility energy cost data, utility customer price data, grid renewable energy data, carbon emissions data, grid event signal data or distribution infrastructure condition data), appliance related data, and vehicle related data, determining, based on the received data, a vehicle-to-grid energy cost and a utility energy cost, and controlling the electric vehicle to discharge electric energy to the local power grid for operating the electric appliance, based on a comparison of the vehicle-to-grid energy cost with the utility energy cost for operating the electric appliance according to the energy usage state.

Other objects, advantages, aspects and features of the present invention will be apparent to one skilled in the relevant art in view of the following detailed description of one or more exemplary embodiments.

BRIEF DESCRIPTION OF THE DRAWINGS

The features, objects, and advantages of the present invention will become more apparent from the detailed description, set forth below, when taken in conjunction with the drawings, in which like reference characters identify correspondingly throughout and wherein:

FIG. 4 is an exemplary method for facilitating improved energy arbitrage and management in accordance with one or more aspects of the present invention.

DETAILED DESCRIPTION OF THE PREFERRED EMBODIMENTS

Figure 1:
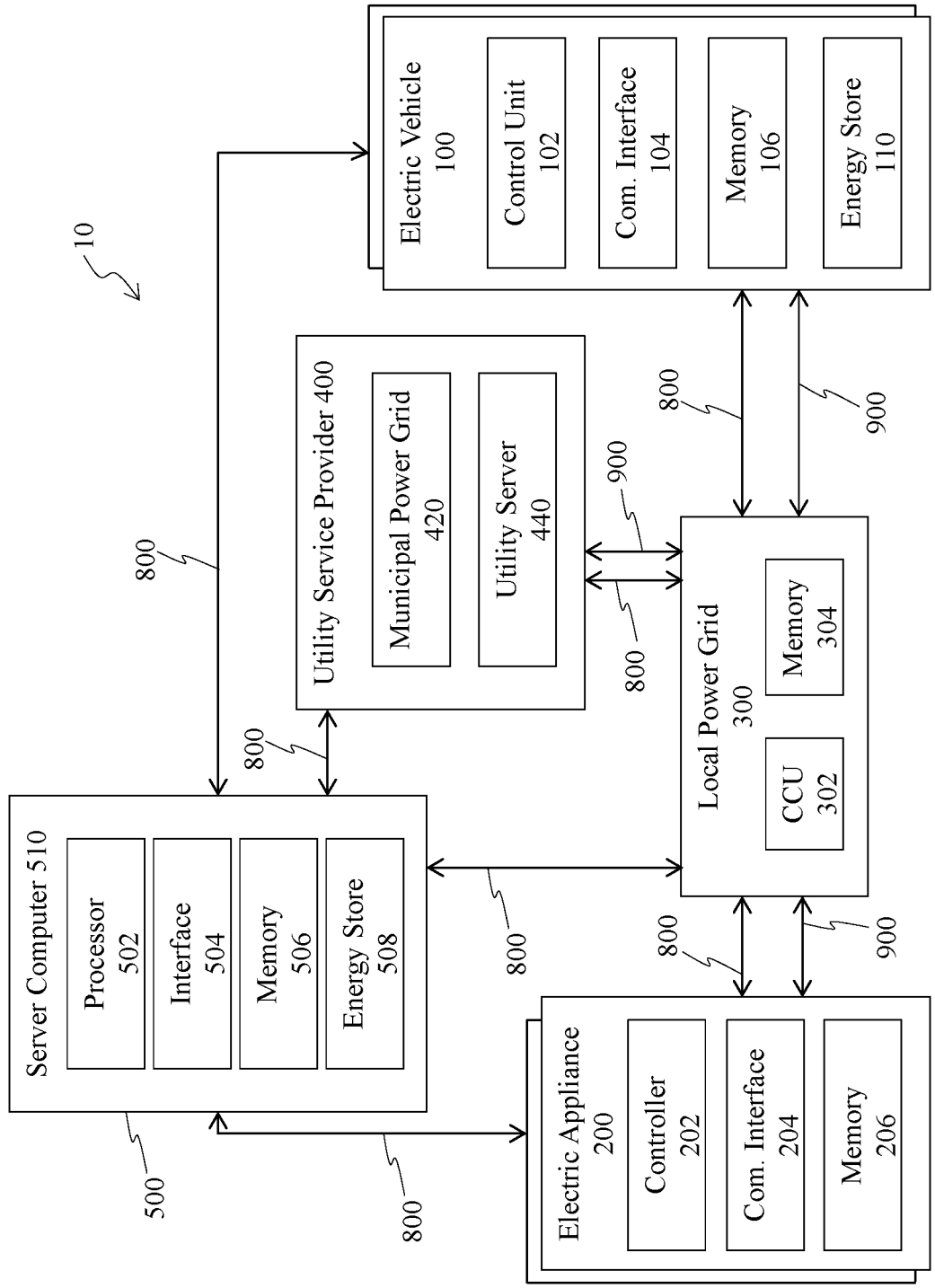
FIG. 1 is an energy management system in accordance with one or more aspects of the present invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

FIG. 1 illustrates an energy management system 10, in accordance with at least one embodiment of the present invention. The energy management system 10 may include an electric vehicle 100 and at least one electric appliance 200 electrically and communicatively connected to a local power grid 300.

The local power grid 300 may be an in-home or on-premises power grid that is electrically connected to a municipal power grid 420. The local power grid 300 may provide electric power from the municipal power grid 420 to on-premises appliances by way of, for example, electric outlets and the like, as is known in the art. The municipal power grid 420 may be operated by a utility service provider 400 that provides electricity via the municipal power grid 420 at a variable price in accordance with a power demand. For example, the utility service provider 400 may charge a higher peak rate at times when there is higher power demand on the municipal power grid 420 and a lower off-peak rate at times when there is a lower power demand on the municipal power grid 420. The municipal power grid 420 may be configured to communicate utility related data, including rate information.

The electric vehicle 100 may be a bi-directional vehicle-to-grid electric vehicle 100 configured to electrically connect to the local power grid 300 for charging and discharging an energy store 110 of the electric vehicle 100, as is known in the art.

The electric vehicle 100 may include a vehicle control unit 102. The vehicle control unit 102 may instruct components of the vehicle to perform various tasks, including energy store charging and discharging related tasks, based on the processing of information, commands and/or data that may have been previously stored or may have been received, via a vehicle communications interface 104, such as instructions, commands and/or data stored in a vehicle memory 106.

The vehicle control unit 102 may be a standard processor, such as a central processing unit (CPU), or may be a dedicated processor, such as an application-specific integrated circuit (ASIC) or a field programmable gate array (FPGA). The vehicle memory 106 may be hardware capable of storing information accessible by the vehicle control unit 102, such as a ROM, RAM, hard-drive, CD-ROM, DVD, write-capable, read-only, etc. The vehicle memory 106 may further store a set of instructions included in software that can be implemented by the vehicle control unit 102 to perform the various tasks, either individually or in connection with other components of the vehicle, in accordance with the principles discussed herein.

The vehicle memory 106 may further store data related to the vehicle, which may be gathered by one or more sensors associated with the vehicle. The vehicle related data may include, for example, a use history, a state-of-charge history, a charging history, etc., based on which determinations may be made as to when to charge and/or discharge the vehicle energy store, by how much, and for how long. The vehicle control unit 102 may instruct components of the vehicle to charge and discharge the energy store based on such determinations.

The at least one electric appliance 200 may be an on-premises appliance, and may further be a smart appliance configured to operate in accordance with received information, data and/or commands affecting the operation thereof. The electric appliance 200 may include a controller 202, which may instruct components of the electric appliance 200 to perform various tasks based on the processing of information, commands and/or data that may have been previously stored or may have been received, via an appliance communications interface 204, such as instructions, commands and/or data stored in an appliance memory 206. The at least one electric appliance 200 may be further configured to gather appliance related data from one or more sensors thereof, to store the appliance related data in the appliance memory 206, and to transmit information, commands and/or data, including the appliance related data, via the appliance communications interface 204.

The controller 202 may be a standard processor, such as a central processing unit (CPU), or may be a dedicated processor, such as an application-specific integrated circuit (ASIC) or a field programmable gate array (FPGA). The appliance memory 206 may be hardware capable of storing information accessible by the controller 202, such as a ROM, RAM, hard-drive, CD-ROM, DVD, write-capable, read-only, etc. The appliance memory 206 may further store a set of instructions included in software that can be implemented by the controller 202 to perform the various tasks, either individually or in connection with other components of the electric appliance 200, in accordance with the principles discussed herein.

The electric appliance 200 may operate according to a plurality of energy usage states, wherein each energy usage state uses a different amount of electricity from the local power grid 300. The plurality of energy usage states may, for example, include a first state, which uses a first amount of electricity, and a second state, which uses a second amount of electricity that is less than the first amount of electricity. The electric appliance 200 may similarly operate according to several additional energy usage states, each of which may use different amounts of electricity less than that used by the first state.

In some embodiments, the electric appliance 200 may be a smart water heater whose first state, heats the stored water to a first target temperature, and whose second state maintains the stored water at or near the first target temperature, or heats the stored water to a second target temperature lower than the first target temperature. The principles of the invention are particularly applicable to smart water heaters because smart water heaters can maintain the stored water at or near the target water temperature for an extended period of time with minimal electricity usage, whereas heating the water to the target water temperature requires significantly more electricity usage.

The principles of the invention are similarly applicable to other electric appliances, such as smart HVAC units or systems whose first phase uses electricity to heat the stored air to a target air temperature, and whose second phase uses a lesser amount of electricity to maintain the stored air at or near the target air temperature. While the principles of the invention are described herein with reference to these exemplary embodiments, the principles of the invention may be applied to other electric appliances without departing from the scope of the invention.

The appliance memory 206 may further store data related to the appliance, which may be gathered by one or more sensors associated with the electric appliance 200. The appliance related data may include, for example, historical data regarding the plurality of energy usage states, historical data regarding the use of the appliance, target temperature data, etc., based on which determinations may be made as to which of the plurality of energy usage states to operate the electric appliance 200 at, and when. The controller 202 may instruct components of the electric appliance 200 to operate in accordance with such determinations.

The municipal power grid 420, the local power grid 300, the electrically connected electric vehicle 100, and the electric appliance 200 may together form a power network 900 via which electricity may be sent and received among the components of the power network. The power network may be any type of power network, wired or wireless, configured to facilitate the transmission of electricity from one component to another component of the power network.

The energy management system 10 may also include a system server 500 that is generally configured to facilitate improved energy arbitrage and management among the smart water heater, the electric vehicle 100, the local power grid 300, and the municipal power grid 420, in accordance with the principles described herein.

The system server 500 may include one or more server computers 510, and may be communicatively coupled to the smart water heater, the electric vehicle 100, the local power grid 300 and/or the municipal power grid 420. The server computer(s) may include appropriately configured hardware, such as, for example, one or more processors 502, memories 504, displays 506 and interfaces 508, as well as appropriate software for instructing the system server 500 to operate in accordance with the principles described herein.

The server processor may be a standard processor, such as a central processing unit (CPU), or may be a dedicated processor, such as an application-specific integrated circuit (ASIC) or a field programmable gate array (FPGA). The server memory may be hardware capable of storing information accessible by the controller 202, such as a ROM, RAM, hard-drive, CD-ROM, DVD, write-capable, read-only, etc. The server memory may further store a set of instructions included in software that can be implemented by the server processor to perform the various tasks, either individually or in connection with other components of the system server 500, in accordance with the principles discussed herein.

The system server 500 may be communicatively coupled to a utility server 440 of the utility service provider 400, and may be able to thereby exchange data, including one or more of: utility rate data indicating peak and off-peak rates and times, grid-congestion event information, electricity supply and demand information, excess electricity supply and demand information, carbon emissions data, renewable energy data, utility tariff information and distribution infrastructure condition data, with the utility server 440. The utility server 440 may likewise include one or more server computers, which may include appropriately configured hardware, such as, for example, one or more processors, memories, displays and interfaces, as well as appropriate software for instructing the utility server 440 to operate in accordance with the principles described herein.

The system server 500 may receive and transmit data, information and/or commands to and from the electric appliance 200 and/or the electric vehicle 100.

In some embodiments, the local power grid 300 may be a smart local power grid 300 in which the allocation and supply of electricity within the local power grid 300 to on-premises appliances is controlled by a central control unit 302, which may be a standard processor, such as a central processing unit (CPU), or may be a dedicated processor, such as an application-specific integrated circuit (ASIC) or a field programmable gate array (FPGA). The central control unit 302 may be coupled to a local memory 304, which may be hardware capable of storing information accessible by the central control unit 302, such as a ROM, RAM, hard-drive, CD-ROM, DVD, write-capable, read-only, etc. The local memory 304 may further store a set of instructions included in software that can be implemented by the central control unit 302 to perform the various tasks, either individually or in connection with other components of the local power grid 300, in accordance with the principles discussed herein.

Accordingly, the system server 500 may receive and transmit data, information and/or commands to and from the electric appliance 200 and/or the electric vehicle 100 either directly or via the central control unit 302 of the local power grid 300.

The central control unit 302 may receive and transmit data, information and/or commands to and from the electric appliance 200 and the electric vehicle 100. The central control unit 302 may further receive and transmit information, data and/or commands to and from the system server 500. The central control unit 302 may perform various tasks based on the processing of data, information and/or commands that may have been received by the central control unit 302. In particular, the central control unit 302 may allocate and supply electricity within the local power grid 300 to on-premises appliances based on the data, information and/or commands received, in part or in whole, from one or more of: the electric appliance 200, the electric vehicle 100 and the system server 500.

One or more of the utility service provider 400, the local power grid 300, the electric appliance 200, the electric vehicle 100 and the system server 500 may therefore form one or more communication networks 800 via which information, data and/or commands affecting the operation thereof may be communicated. The communication network(s) may be any type of communication network, wired or wireless, configured to facilitate the communication and transmission of information, data, commands, etc. from one component to another component of the communication network(s) and between communication network(s). For example, the communication network(s) may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of communication network.

The system server 500 may perform various tasks based on the processing of data, information and/or commands that may have been received by the system server 500. In particular, the system server 500 may control one or more of: the electric appliance 200, the electric vehicle 100 and the local power grid 300, based on the data, information and/or commands received, so as to facilitate the improved energy arbitrage and management.

The system server 500 may accordingly determine one or more solutions to an energy draw optimization problem. The energy draw optimization problem may seek to determine whether it is more optimal to draw the energy used to operate the electric appliance 200 from the municipal power grid 420 or from the energy store 110 of the electric vehicle.

The energy draw optimization problem may include one or more boundary conditions. An exemplary boundary condition may be to minimize the cost of using electricity provided by the utility service provider 400, via the municipal power grid 420, to operate the electric appliance 200 at its various energy usage states in accordance with anticipated uses of the electric appliance 200. Another exemplary boundary condition may be to ensure that the state-of-charge of the vehicle energy store is sufficient for any anticipated uses of the electric vehicle 100. Still further exemplary boundary conditions may include: maximizing the use of electricity drawn from renewable or "green" energy sources, or minimizing the carbon emissions associated with the drawn electricity. One or more of the boundary conditions may be weighted so as to increase or decrease their importance to the draw optimization problem.

It will be understood that the anticipated uses of the electric appliance 200 may be determined from the appliance related data by the system server 500, or may be determined by the controller 202 and transmitted to the system server 500. Similarly, the anticipated uses of the electronic vehicle may be determined from the vehicle related data by the system server 500, or may be determined by the vehicle control unit 102 and transmitted to the system server 500.

The energy draw optimization problem may take into account that electrical energy from the vehicle energy store may be discharged to the local power grid 300 to power the electric appliance 200. The energy draw optimization problem may also take into account that the vehicle energy store may be charged with electricity from the municipal power grid 420 via the local power grid 300. The energy draw optimization problem may also take into account the anticipated uses of the vehicle.

In some embodiments, the system server 500 may determine, based on the received data, one or more characteristic profiles from which to solve the energy draw optimization problem. Exemplary characteristic profiles will now be described, with reference to the smart water heater, though one of ordinary skill in the art will understand that the principles may be applied to other electric appliances.

The system server 500 may determine one or more utility energy cost profiles, each of which correlates the cost of using power from the municipal power grid 420 of the utility service provider 400 to operate the water heater at a corresponding energy usage state, for each point-in-time over a time period. The determination of the utility energy cost profile may take into account a heating element scaling factor derived from the resistance produced by the heating current. The utility energy cost profile may be determined based on the utility related data, the appliance related data, and/or the vehicle related data.

The system server 500 may determine one or more V2G energy cost profiles, each of which correlates the cost of using power discharged from the electric vehicle 100 to operate the water heater at the corresponding energy usage state, for each point-in-time over the period of time. The determination of the V2G energy cost profile may take into account energy losses due to a switchover between V2G and municipality power grid sourced power. The V2G energy cost profile may be determined based on the utility related data, the appliance related data, and/or the vehicle related data.

The system server 500 may determine one or more vehicle energy cost profiles, each of which correlates the cost of using power from the municipal power grid 420 to charge the vehicle energy store from a corresponding state-of-charge, for each point-in-time over the time period. The vehicle energy cost profile may be determined based on the utility related data, the appliance related data, and/or the vehicle related data.

The system server 500 may determine one or more renewable energy profiles, each of which correlates an amount (e.g., percent) of the energy of the municipal power grid 420 that is from renewable or "green" energy sources for each point-in-time over the period of time. The determination of the renewable energy profiles may be determined based on the utility related data, the appliance related data, and/or the vehicle related data.

The system server 500 may determine one or more carbon emission profiles, each of which correlates an amount (e.g., gram per kilowatt hour) of carbon emissions associated with the energy of the municipal power grid 420 for each point-in-time over the period of time. The determination of the carbon emission profiles may be determined based on the utility related data, the appliance related data, and/or the vehicle related data.

The system server 500 may determine one or more minimum state-of-charge profiles, each of which correlates minimum states-of-charge of the vehicle energy store that are sufficient for anticipated uses of the vehicle, for each point-in-time over the time period. The minimum state-of-charge profile may be determined based on the utility related data, the appliance related data, and/or the vehicle related data.

The system server 500 may determine a vehicle state-of-charge profile, which correlates the state-of-charge and predicted states-of-charge of the vehicle energy store, for each point-in-time over the time period. The vehicle state-of-charge profile may be determined based on the utility related data, the appliance related data, and/or the vehicle related data.

The system server 500 may determine a temperature minimum profile, which correlates minimum temperatures of the stored water in the water heater (or air in the HVAC) that are sufficient for anticipated uses of the water heater (or HVAC), for each point-in-time over the time period. The temperature minimum profile may be determined based on the utility related data, the appliance related data, and/or the vehicle related data.

The server system 500 may, based on one or more of the characteristic profiles and boundary conditions, determine, for each of one or more operating periods $\Delta t_n$, whether it is overall more desirable to power the water heater with electricity drawn from the municipal power grid 420 or from the energy store 110 of the electric vehicle. The system server 500 may, in response to the determination, control the vehicle to discharge electricity to the local power grid 300 for use by the water heater in operating at the energy usage state during the respective operating period, or may otherwise cause the vehicle not to so discharge and the water heater to draw electricity from the municipal power grid 420 instead. As discussed above, this determination may take into account one or more of: cost optimization, renewable energy optimization and carbon emissions optimization, in addition to other desirable boundary conditions that may affect the desirability of one source over another, including local electricity distribution infrastructure conditions.

For example, the system server 500 may, based on one or more of the characteristic profiles, determine, for a first operating period $\Delta t_1$, whether the V2G energy cost is less than the municipal energy cost of operating the appliance at the energy usage state. The system server 500 may, in response to the determination, control the vehicle to discharge electricity to the local power grid 300 for use by the appliance in operating at the energy usage state during the first operating period.

The system server 500 may determine a second operating period $\Delta t_2$, where the V2G energy cost is more than the municipal energy cost of operating the appliance at the energy usage state. The system server 500 may, in response to the determination, control the vehicle to not discharge electricity to the local power grid 300, and to use the municipal power grid 420 for operating the electronic appliance at the energy usage state during the second operating period.

The determination of one or more operating periods $\Delta_m$ may be subject to one or more constraints based on one or more of the characteristic profiles. The determination may be constrained to ensure that the state-of-charge of the vehicle energy store during an operating period is sufficient to operate the water heater to heat water at least to the minimum temperature corresponding to the operating period. The determination may be constrained to ensure that the state-of-charge of the vehicle energy store after discharging to the local power grid 300 is at or above the corresponding minimum state-of-charge. The determination may be constrained by preferred energy performances of the water heater and/or the electric vehicle 100 over the operating periods.

The system server 500 may make these determinations for each energy usage state, and may therefore optimize control of the electric appliance 200 and the electric vehicle 100 to minimize energy costs of operating the electronic appliance, thus facilitating effective energy arbitrage and management. As such, the system server 500 may control the operation of the local power grid 300, the electronic appliance and the electric vehicle 100 as an aggregated resource.

The system server 500 may utilize machine learning, artificial intelligence and/or one or more algorithmic approaches, to solve the energy cost optimization problem. The system server 500 may determine the one or more solutions based on the utility rate data, the appliance related data, and the vehicle related data.

It will also be understood that some or all of the functions of the system server 500 may be performed by the central control unit 302 and/or the appliance controller 202, and vice versa.

Figure 2:
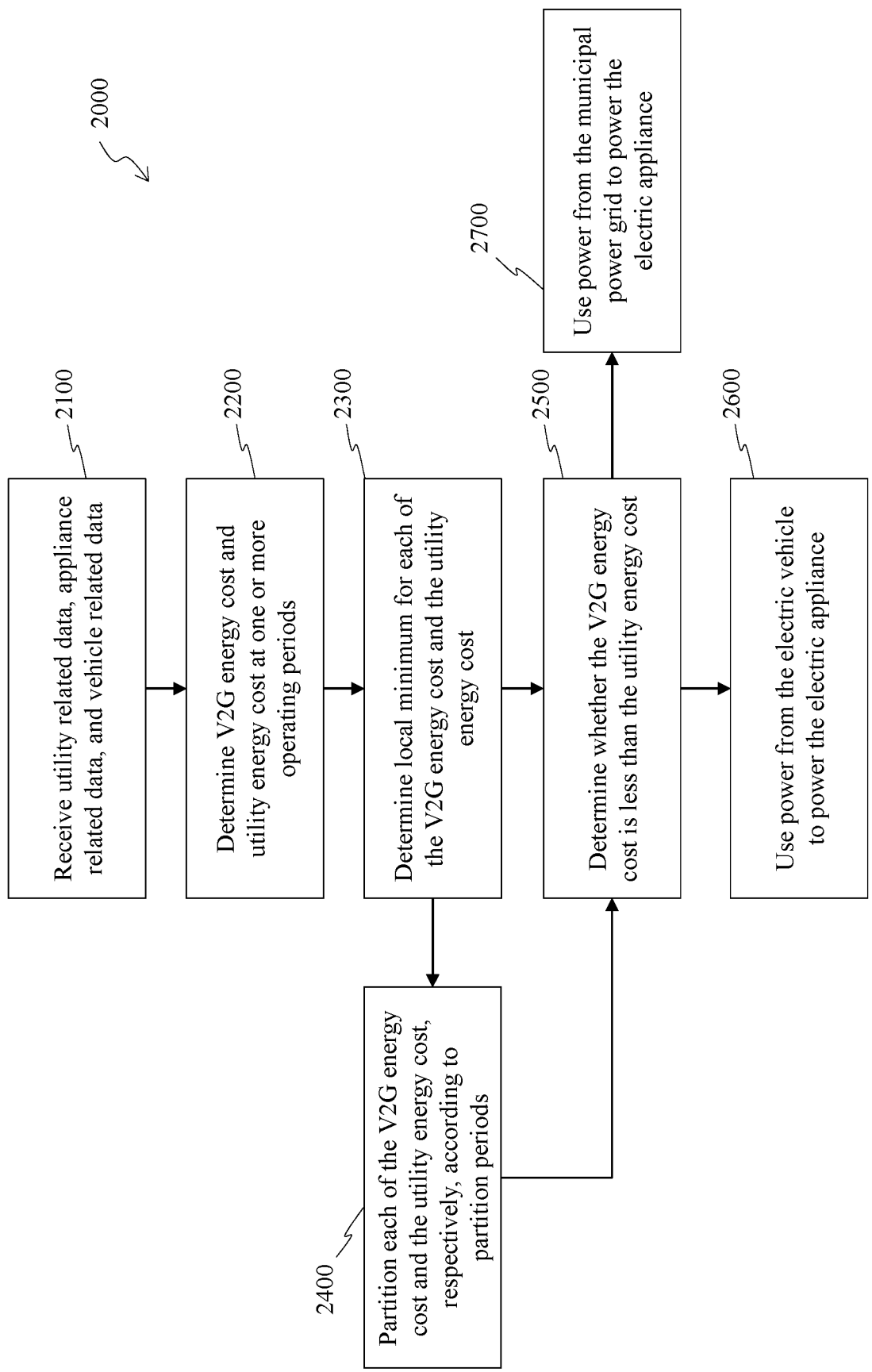
FIG. 2 is an exemplary for facilitating improved energy arbitrage and management in accordance with one or more aspects of the present invention.
Figure 3:
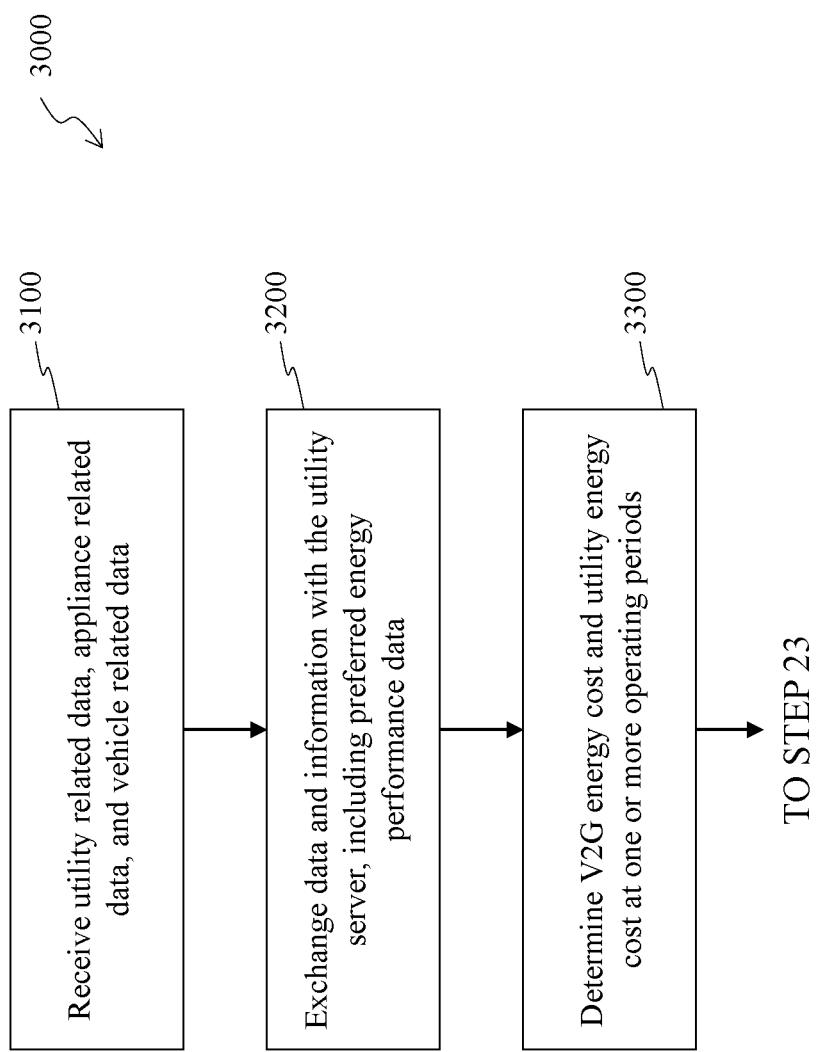
FIG. 3 is an exemplary method for facilitating improved energy arbitrage and management in accordance with one or more aspects of the present invention.

FIGS. 2-4 illustrate exemplary energy arbitrage and management methods in accordance with one or more aspects of the invention.

Turning now to FIG. 2, an exemplary method 2000 for arbitraging and managing the energy cost of the water heater will be described.

At step 2100, the system server 500 receives utility rate data, appliance related data, and vehicle related data from the utility server 440, the smart water heater, and the electronic vehicle, respectively. This data may be in the form of raw or processed data, and/or one or more of the characteristic profiles discussed herein.

At step 2200, based on the received data, the system server 500 determines the V2G energy cost and the utility energy cost for operating the smart water heater, at one or more operating periods $\Delta t_n$, according to the energy usage state that corresponds with the anticipated usage of the water heater.

At step 2300, the system server 500 determines, for each of the V2G energy cost and the utility energy cost, whether a local minimum exists. The local minimum may correspond to an operating period during which the energy cost is lower than one or more surrounding operating periods. If it is determined that a local minimum exists for the V2G energy cost and/or the utility energy cost, the method proceeds to step 2400. If it is determined that no local minimum exists, the method proceeds to step 2500.

At step 2400, the system server 500 partitions each of the V2G energy cost and the utility energy cost, respectively, according to partition periods having the same, or nearly the same, respective energy cost. That is to say, the partitioning is such that for each partition period, both the V2G energy cost and the utility energy cost may be represented as constant values that are readily compared for the same partition period. It will be understood that the partition periods may span one or more operating periods.

At step 2500, the system server 500 determines, on a partition-period-by-partition-period or on an operating-period-by-operating-period basis, as the case may be, whether the V2G energy cost is less than the utility energy cost. If so, the method proceeds to step 2600. If not, the method proceeds to step 2700. The determination may be by comparing the V2G energy cost to the utility energy cost for a given partition period or operating period, as the case may be.

At step 2600, the system server 500 directs or otherwise controls the electric vehicle 100 to discharge the vehicle energy store to the local power grid 300 in an amount sufficient to power the operation of the water heater, the control being on a partition-period-by-partition-period or on an operating-period-by-operating-period basis, as the case may be.

At step 2700, the system server 500 directs or otherwise controls the electric vehicle 100 not to discharge the vehicle energy store, and the system server 500 directs or otherwise controls the smart water heater (or the central control unit 302 of the local power grid 300) to use power from the municipal power grid 420 to power the operation of the smart water heater. The control may be on a partition-period-by-partition-period or on an operating-period-by-operating-period basis, as the case may be. This no-discharge state may be a default state of operation such that no affirmative command is required, the lack of the affirmative command or control being an implicit direction.

Turning now to FIG. 3, an exemplary method 3000 for arbitraging and managing the aggregated resource (i.e., the combined local power grid 300, water heater and electric vehicle 100) will be described.

At step 3100, the system server 500 receives appliance related data, and vehicle related data from the smart water heater and the electronic vehicle, respectively. This data may be in the form of raw or processed data, and/or one or more of the characteristic profiles discussed herein.

At step 3200, the system server 500 exchanges data and information, including appliance related data, vehicle related data, utility related data with the utility server 440. In particular, the system server 500 transmits appliance related data and vehicle related data, and receives utility related data instructing the system server 500 regarding a preferred energy performance of the aggregated resource during one or more operating periods.

At step 3300, based on the received data, the system server 500 determines the V2G energy cost and the utility energy cost for operating the smart water heater, over the one or more operating periods $\Delta t_n$. The determination is made using the preferred energy performance of the aggregated resource as an additional constraint.

The exemplary method of FIG. 3 then converges with the method of FIG. 2 at step 2300 to effectuate control of the aggregated resource by the system server 500. In this manner, the system further takes into account the preferred energy performance of the aggregate system in determining when and according to which energy usage state to operate the water heater.

Turning now to FIG. 4, an exemplary method 4000 for managing the power consumption of the water heater will be described.

At step 4100, the system server 500 receives appliance related data, and vehicle related data from the smart water heater and the electronic vehicle, respectively. This data may be in the form of raw or processed data, and/or one or more of the characteristic profiles discussed herein. In particular, the system server 500 receives location data from the electric vehicle 100, which may occur periodically, while the electric vehicle 100 is off-premises.

At step 4200, an anticipated return time is determined, at which the electric vehicle 100 is anticipated to return to the premises and connected to the local power grid 300. The determinations at this step may be made by the system server 500 based on the received data. Alternatively, the determinations may be made by the vehicle control unit 102 and transmitted to the system server 500 in accordance with step 4100.

At step 4300, based on the received data, the system server 500 determines the V2G energy cost and the utility energy cost for operating the smart water heater, over the one or more operating periods $\Delta t_n$. The determination is made using the anticipated return time as an additional constraint. For example, V2G energy is unavailable to the local grid during operating periods where the electric vehicle 100 is not connected to the local power grid 300.

The exemplary method of FIG. 4 then converges with the method of FIG. 2 at step 2300 to effectuate control of at least the water heater by the system server 500. In this manner, the system further takes into account the availability of the electric vehicle 100 in determining when and according to which energy usage state to operate the water heater.

As an alternative to step 4200, an a perimeter distance may be determined, beyond which the electric vehicle 100 is unlikely to return to the premises and connect to the local power grid 300 before the water heater may be controlled to heat the stored water to the first target temperature.

The operations of the water heater may then be similarly controlled based on the vehicle location relative to the perimeter distance. For example, the system server 500 may permit or otherwise control the water heater to sustain the water temperature at the second target temperature while the electric vehicle 100 is beyond the perimeter distance, and to heat the stored water to the first target temperature when the electric vehicle 100 is within the perimeter distance, such permission may provide a further constraint.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

Moreover, various elements described herein generally include hardware and/or software/firmware, including but not limited to: processors, memories, input/output interfaces, operating systems and network interfaces, configured to effectuate the functionalities described herein. When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. An energy management system, comprising:
   a local power grid configured to route electricity, the local power grid configured to receive electricity from a municipal power grid of a utility service provider;
   an electric appliance electrically coupled to the local power grid, the electric appliance configured to receive electricity from the local power grid for operating according to an energy usage state;
   an electric vehicle electrically coupleable to the local power grid, the electric vehicle configured to exchange electricity with the local power grid; and
   a system server communicatively coupled to the electric appliance and the electric vehicle, the system server configured to:
   receive utility related data, appliance related data, and vehicle related data, determine, based on the received data:
    a vehicle-to-grid energy desirability reflecting desirability, over a projected operating period, of discharging electric energy from the electric vehicle to the local power grid to operate the electric appliance according to the energy usage state over the projected operating period, and
    a utility energy desirability reflecting desirability, over the projected operating period, of receiving electric energy from the municipal power grid by the local power grid to operate the electric appliance according to the energy usage state over the projected operating period, and
control the electric vehicle to discharge electric energy to the local power grid for operating the electric appliance, based on a comparison of the vehicle-to-grid energy desirability with the utility energy desirability for operating the electric appliance according to the energy usage state.

2. The energy management system of claim 1, wherein the vehicle-to-grid energy desirability and utility energy desirability are determined according to a plurality of projected operating periods of the electronic appliance.

3. The energy management system of claim 2, wherein the system server is further configured to:
    determine, for each of the vehicle-to-grid energy desirability and the utility energy desirability, whether a local minimum exists,
    partition the determined vehicle-to-grid energy desirability and the determined utility energy desirability according to partition periods,
    wherein the comparison of the vehicle-to-grid energy desirability with the utility energy desirability is on a partition-period-by-partition-period-basis.

4. The energy management system of claim 1, wherein the system server is further configured to:
    control the electric vehicle to not discharge electric energy to the local power grid for operating the electric appliance, based on the comparison of the vehicle-to-grid energy desirability with the utility energy desirability.

5. The energy management system of claim 1, wherein the system server is communicatively coupled to a utility server of the utility service provider so as to receive the utility data therefrom, including preferred performance data.

6. The energy management system of claim 1, wherein, when the electric vehicle is away from the local power grid, the vehicle related data includes an anticipated return time of the vehicle and/or the location of the vehicle with respect to a perimeter distance from the local power grid.

7. The energy management system of claim 1, wherein the system server is further configured to:
    determine an optimal operating period at which an energy desirability for operating the electric appliance is minimized,
    wherein the control of the electric vehicle discharge is according to the optimal operating period.

8. An energy management system, comprising:
    a system server, the system server communicatively coupled to an electric appliance that is in turn electrically coupled to a local power grid so as to receive electricity from the local power grid for operating according to an energy usage state, the system server communicatively coupled to an electric vehicle that is in turn electrically coupleable to the local power grid so as to exchange electricity with the local power grid, the local power grid being configured to route electricity among the electric appliance, the electric vehicle, and a municipal power grid of a utility service provider,
    wherein the system server is configured to:
        receive utility related data, appliance related data, and vehicle related data,
        determine, based on the received data:
            a vehicle-to-grid energy desirability reflecting desirability, over a projected operating period, of discharging electric energy from the electric vehicle to the local power grid to operate the electric appliance according to the energy usage state over the projected operating period, and
            a utility energy desirability reflecting desirability, over the projected operating period, of receiving electric energy from the municipal power grid by the local power grid to operate the electric appliance according to the energy usage state over the projected operating period, and
        control the electric vehicle to discharge electric energy to the local power grid for operating the electric appliance, based on a comparison of the vehicle-to-grid energy desirability with the utility energy desirability for operating the electric appliance according to the energy usage state.

9. The energy management system of claim 8, wherein the vehicle-to-grid energy desirability and utility energy desirability are determined according to a plurality of projected operating periods of the electronic appliance.

10. The energy management system of claim 9, wherein the system server is further configured to:
    determine, for each of the vehicle-to-grid energy desirability and the utility energy desirability, whether a local minimum exists,
    partition the determined vehicle-to-grid energy desirability and the determined utility energy desirability according to partition periods,
    wherein the comparison of the vehicle-to-grid energy desirability with the utility energy desirability is on a partition-period-by-partition-period-basis.

11. The energy management system of claim 8, wherein the system server is further configured to:
    control the electric vehicle to not discharge electric energy to the local power grid for operating the electric appliance, based on the comparison of the vehicle-to-grid energy desirability with the utility energy desirability.

12. The energy management system of claim 8, wherein the system server is communicatively coupled to a utility server of the utility service provider so as to receive the utility data therefrom, including preferred performance data.

13. The energy management system of claim 8, wherein, when the electric vehicle is away from the local power grid, the vehicle related data includes an anticipated return time of the vehicle and/or the location of the vehicle with respect to a perimeter distance from the local power grid.

14. The energy management system of claim 8, wherein the system server is further configured to:
    determine an optimal operating period at which an energy desirability for operating the electric appliance is minimized,
    wherein the control of the electric vehicle discharge is according to the optimal operating period.

15. A method for operating a system, the system comprising: a local power grid configured to route electricity, the local power grid configured to receive electricity from a municipal power grid of a utility service provider; an electric appliance electrically coupled to the local power grid, the electric appliance configured to receive electricity from the local power grid for operating according to an energy usage state; an electric vehicle electrically coupleable to the local power grid, the electric vehicle configured to exchange electricity with the local power grid; and a system server communicatively coupled to the electric appliance and the electric vehicle, the method comprising:

receiving utility related data, appliance related data, and vehicle related data, determining, based on the received data:

a vehicle-to-grid energy desirability reflecting desirability, over a projected operating period, of discharging electric energy from the electric vehicle to the local power grid to operate the electric appliance according to the energy usage state over the projected operating period, and a utility energy desirability reflecting desirability, over the projected operating period, of receiving electric energy from the municipal power grid by the local power grid to operate the electric appliance according to the energy usage state over the projected operating period, and controlling the electric vehicle to discharge electric energy to the local power grid for operating the electric appliance, based on a comparison of the vehicle-to-grid energy desirability with the utility energy desirability for operating the electric appliance according to the energy usage state.

16. The method of claim 15, wherein the vehicle-to-grid energy desirability and utility energy desirability are determined according to a plurality of projected operating periods of the electronic appliance.

17. The method of claim 16, further comprising
determining, for each of the vehicle-to-grid energy desirability and the utility energy desirability, whether a local minimum exists,
partitioning the determined vehicle-to-grid energy desirability and the determined utility energy desirability according to partition periods,
wherein comparing the vehicle-to-grid energy desirability with the utility energy desirability is on a partition-period-by-partition-period-basis.

18. The method of claim 15, wherein the system server is communicatively coupled to a utility server of the utility service provider so as to receive the utility data therefrom, including preferred performance data.

19. The method of claim 15, wherein, when the electric vehicle is away from the local power grid, the vehicle related data includes an anticipated return time of the vehicle and/or the location of the vehicle with respect to a perimeter distance from the local power grid.

20. The method of claim 15, further comprising:
determining an optimal operating period at which an energy desirability for operating the electric appliance is minimized, wherein controlling the electric vehicle discharge is according to the optimal operating period.

* * * * *